(12) United States Patent
Protas et al.

(10) Patent No.: US 7,052,052 B2
(45) Date of Patent: May 30, 2006

(54) SEALING GASKET FOR A CLAMP

(75) Inventors: Michael J. Protas, Robbinsdale, MN (US); Wayne M. Wagner, Apple Valley, MN (US); John I. Belisle, Hampton, MN (US)

(73) Assignee: Donaldson Company, Inc., Minneapolis, MN (US)

( * ) Notice: Subject to any disclaimer, the term of this patent is extended or adjusted under 35 U.S.C. 154(b) by 86 days.

(21) Appl. No.: 10/387,705

(22) Filed: Mar. 13, 2003

(65) Prior Publication Data

US 2004/0178632 A1  Sep. 16, 2004

(51) Int. Cl.
*F16L 25/00* (2006.01)

(52) U.S. Cl. ............... 285/420; 285/915; 285/419

(58) Field of Classification Search ........... 285/148.23, 285/148.24, 337, 420, 915, 419; 604/179, 604/304, 308; 424/448, 449; 602/48, 49–51, 602/53, 58, 59; 606/213
See application file for complete search history.

(56) References Cited

U.S. PATENT DOCUMENTS

| | | | |
|---|---|---|---|
| 848,139 A | 3/1907 | Stuppar | |
| 852,997 A | 5/1907 | Brandram | |
| 973,466 A | 10/1910 | Beegen | |
| 1,146,813 A | 7/1915 | Peterman et al. | |
| 2,004,182 A | 6/1935 | Arey | |
| 2,227,551 A | 1/1941 | Morris | |
| 2,690,193 A | 9/1954 | Smith | |
| 2,751,236 A * | 6/1956 | Wyatt ................. 285/294.1 | |
| 2,908,061 A | 10/1959 | Adams | |
| 2,998,629 A | 9/1961 | Smith | |
| 3,004,781 A | 10/1961 | Morris | |
| 3,565,468 A | 2/1971 | Garrett | |
| 3,905,623 A | 9/1975 | Cassel | |
| 3,944,265 A | 3/1976 | Hiemstra et al. | |
| 4,049,298 A | 9/1977 | Foti | |
| 4,056,273 A | 11/1977 | Cassel | |
| 4,142,743 A | 3/1979 | McGowen et al. | |
| RE30,042 E | 7/1979 | Hiemstra et al. | |
| 4,165,109 A | 8/1979 | Foti | |
| 4,261,600 A | 4/1981 | Cassel | |
| 4,312,526 A | 1/1982 | Cassel | |
| 4,364,588 A | 12/1982 | Thompson | |
| 4,365,392 A | 12/1982 | Heckethorn | |
| 4,390,519 A * | 6/1983 | Sawyer ................. 602/50 | |
| 4,408,788 A | 10/1983 | Beukema | |
| 4,463,975 A | 8/1984 | McCord | |
| 4,558,891 A | 12/1985 | Wagner et al. | |

(Continued)

FOREIGN PATENT DOCUMENTS

GB   373678   6/1932

OTHER PUBLICATIONS

U.S. Appl. No. 09/953,401, filed Sep. 14, 2001.

(Continued)

*Primary Examiner*—Aaron Dunwoody
(74) *Attorney, Agent, or Firm*—Merchant & Gould P.C.

(57) ABSTRACT

A device for sealing a lap joint between two conduits is disclosed herein. The device includes a band clamp. The device also includes a packet or other type of container secured to the band clamp. The packet contains a sealant which moves or flows to void areas between the clamp and the conduits during clamp tightening to provide a more fluid tight seal about the lap joint.

11 Claims, 4 Drawing Sheets

U.S. PATENT DOCUMENTS

| | | | |
|---|---|---|---|
| 4,790,574 A | | 12/1988 | Wagner et al. |
| 4,813,720 A | | 3/1989 | Cassel |
| 5,116,083 A | | 5/1992 | Gillingham et al. |
| 5,180,360 A | * | 1/1993 | Rhame, Jr. .................. 602/53 |
| 5,246,705 A | * | 9/1993 | Venkatraman et al. ...... 424/448 |
| 5,470,625 A | * | 11/1995 | Perrault ....................... 602/48 |
| 5,722,701 A | * | 3/1998 | Choi ........................... 285/337 |
| 6,116,659 A | | 9/2000 | Wagner |
| 6,143,946 A | * | 11/2000 | Docter ......................... 602/53 |
| 6,269,524 B1 | | 8/2001 | Cassel |
| 6,634,607 B1 | * | 10/2003 | Vogel et al. ................ 285/419 |
| 6,814,976 B1 | * | 11/2004 | Hille et al. ................. 424/448 |

OTHER PUBLICATIONS

Exhibit 1 Two photographs of a Walker Mega-Clamp Heavy Duty Muffler Clamp.

Exhibit 2 Photograph of a Flex-Seal II Preassembled Exhaust Clamp sold by Federal Hose Manufacturing Corp.

Exhibit 3 Photograph of a sealing bar of a muffler clamp sold by Torca Products, Inc.

* cited by examiner

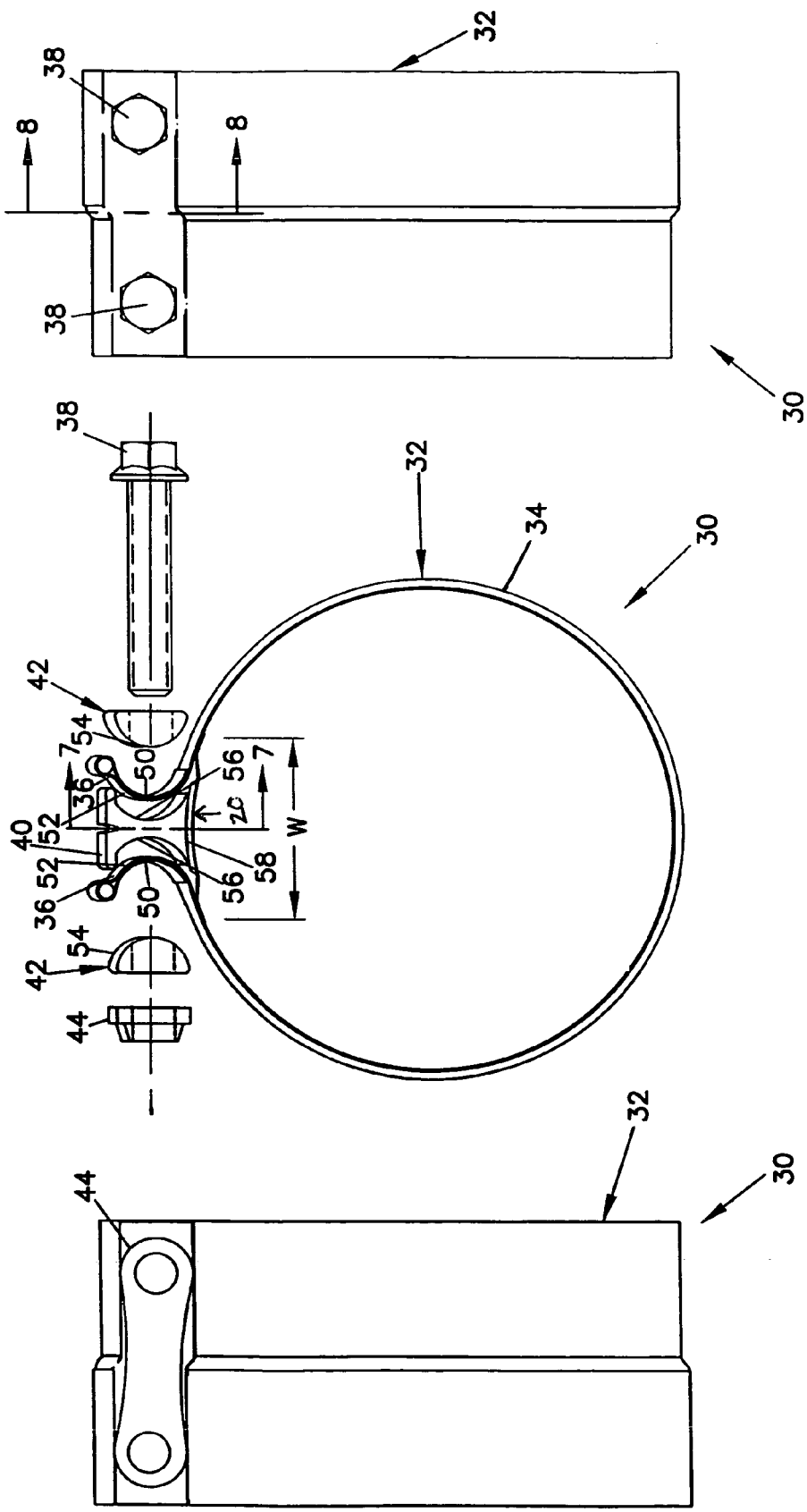

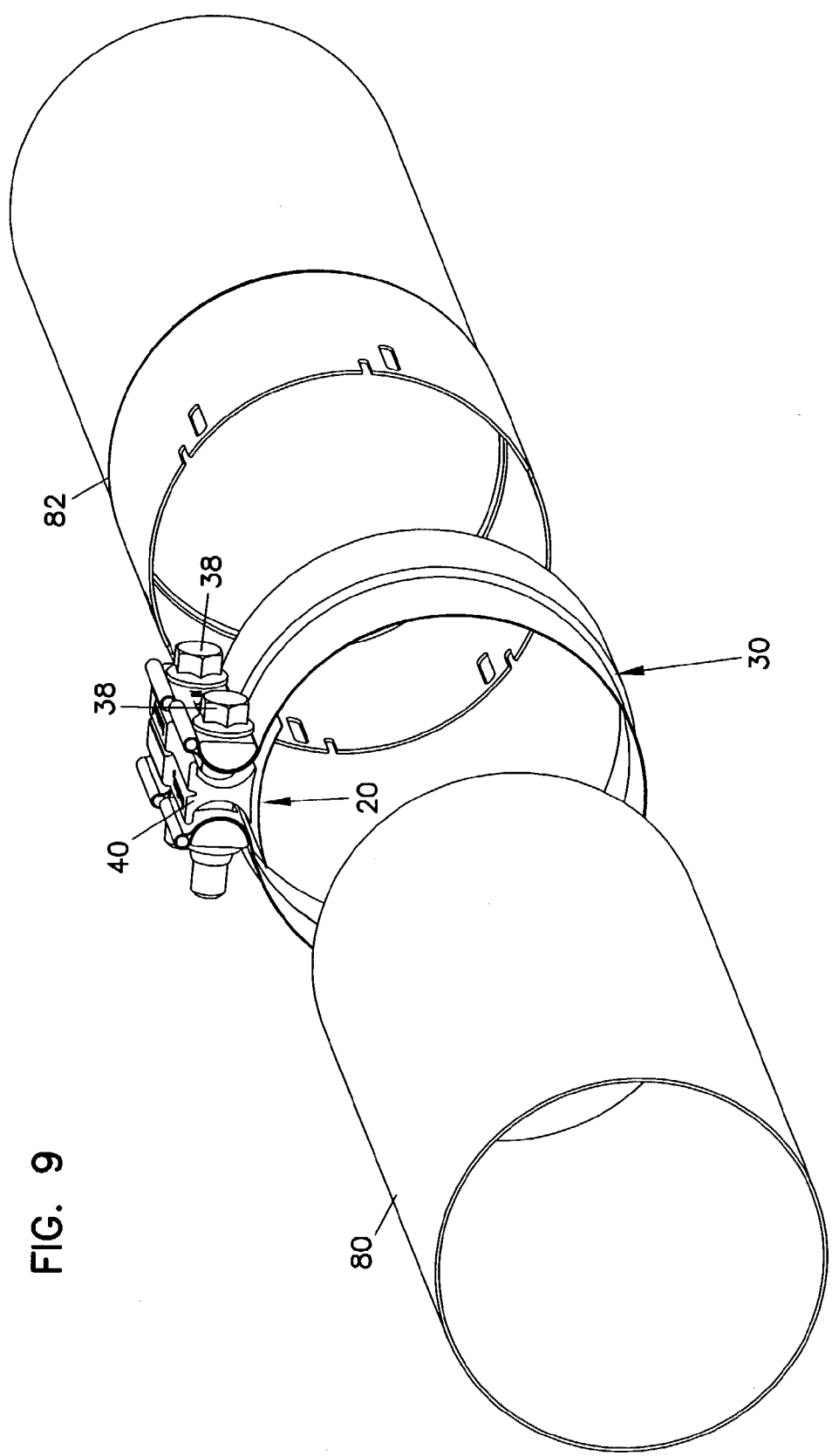

SEALING GASKET FOR A CLAMP

TECHNICAL FIELD

The present invention relates generally to clamps. More particularly, the present invention relates to clamps having sealing gaskets.

BACKGROUND

There are many applications where it is desirable to connect two conduits (e.g., tubes, pipes, flexible hose, ducts, etc.) together. One common application is in vehicle exhaust systems. In vehicle exhaust systems, two conduits are often connected at a "lap joint." A "lap joint" is formed by inserting the end of one conduit into the end of another conduit such that the ends overlap one another. A clamp is then tightened around the overlap ends of the conduits. The clamp preferably functions to seal the lap joint and to mechanically connect the two conduits together such that the two conduits are prevented from being pulled apart.

Numerous patents exist relating to clamps used for vehicle exhaust systems. Some patents relating to this field include U.S. Pat. No. 4,312,526 to Cassel, U.S. Pat. No. 4,813,720 to Cassel, U.S. Pat. No. 6,116,659 to Wagner, U.S. Pat. No. 4,790,574 to Wagner et al. and the U.S. Pat. No. 5,116,083 to Gillingham et al.

It is desirable for a clamp to minimize leaks at a lap joint. A tight seal at a lap joint prevents exhaust gases from leaking through the lap joint. Tight seals can also prevent moisture from entering the conduits through the lap joint. This is particularly important for vehicles, such as military vehicles, that are required to ford streams.

SUMMARY

One aspect of the present disclosure relates to a gasket for use with a clamp. The gasket is secured to the clamp and includes a container holding a sealant material. When the clamp is tightened about a lap joint, the sealant material preferably fills void areas of the clamp prone to leakage so as to provide an improved seal.

Examples of a variety of inventive aspects are set forth in the description that follows. It is to be understood that both the forgoing general description and the following detailed description are exemplary and explanatory only and are not restrictive of the broad inventive aspects that underlie the examples disclosed herein.

BRIEF DESCRIPTION OF THE DRAWINGS

FIG. 4 is an end view of the clamp and sealing gasket of FIG. 3;

FIG. 5 is a left side view of the clamp of FIG. 4;

FIG. 6 is a right side view of the clamp of FIG. 4;

FIG. 9 is a perspective view of the clamp and sealing gasket of FIG. 3 being used to seal a lap joint between two conduit sections.

DETAILED DESCRIPTION

Figure 1:
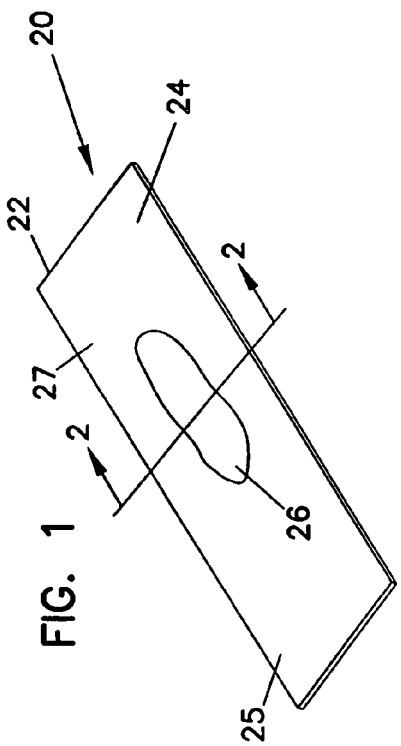
FIG. 1 is a perspective view of a sealing gasket having features that are examples of how inventive aspects in accordance with the principles of the present disclosure may be practiced.
Figure 2:
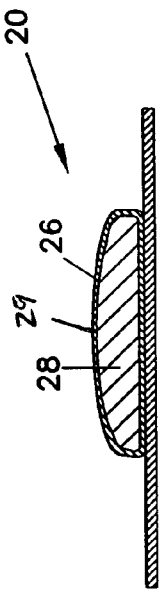
FIG. 2 is a cross-sectional view taken along section line 2—2 of FIG. 1.

FIG. 1 illustrates a sealing gasket 20 having features that are examples of inventive aspects in accordance with the principles of the present disclosure. The gasket 20 includes a strip of adhesive tape 22 having at least one adhesive side 24. A container 26 is secured to the adhesive side 24 of the adhesive tape 22. The container 26 preferably contains a sealant material 28 (see FIG. 2). Preferably, portions 25, 27 of the adhesive side 24 of the adhesive tape 22 extend beyond the container 26 and are available for securing the sealing gasket 20 to a desired location on a clamp.

In addition to tape, any number of structures could be used to secure the container 26 to a clamp. For example, an adhesive or epoxy could be applied directly to the container 26 without the use of a carrier film typically provided by an adhesive tape. If tape is used, either single-sided or double-sided tape could be used. In one non-limiting embodiment, a single-sided aluminum foil tape can be used. Alternatively, fiber glass tape or other types of tapes could be used.

The container 26 can have a variety of configurations. In a preferred embodiment, the container 26 is air tight so as to maintain the shelf-life of the sealant by preventing the sealant from prematurely drying out or curing. In one embodiment, the container 26 can be configured as a flexible pouch or packet 29 (FIG. 2) made of a material such as plastic. In certain embodiments, the container 26 can be configured to break when its corresponding clamp is tightened thereby allowing the sealant to flow from the container 26 to fill void areas between the clamp and a lap joint. In other embodiments, the container can remain unbroken when the clamp is tightened. In such embodiments, the sealant flows within the container thereby allowing the container to deform to conform to the shape of void areas between the clamp and the lap joint. In this type of embodiment, a heat curable or heat activated sealant could be used.

It will be appreciated that the size of the container 26 will vary depending upon the application. As shown in FIG. 1, the container 26 shown secured to a mid-region of the strip of adhesive tape 22. In the depicted embodiment, which is adapted for use in sealing a clamp having a diameter in the range of 2 to 6 inches, the container 26 is sized for holding about 0.5 milliliters of sealant material. Of course, containers of various sizes can be used without departing from the principles of the present invention.

A variety of sealant materials can be used within the container 26. However, it is preferred for the sealant materials to be flowable to facilitate allowing the sealant material to move to and fill areas desired to be sealed. In a preferred embodiment, the sealant material 28 has a paste-like texture. In one embodiment, the sealant material is a muffler and exhaust repair sealer such as products sold by Victor Products of Des Plaines, Ill., under the name "Miracle Patch Muffler and Exhaust Repair Sealer." Other sealants such as furnace/stove mortars, furnace/stove cements, epoxy resins, or drywall compound could also be used. In other embodiments, a flowable material with a filler is used. One example includes a flowable material such as calcium silicate with an inorganic filler such as silicon dioxide. In another embodiment, an epoxy resin can be used with an inorganic filler such as silicon dioxide. Other fillers such as aluminum powder or silica could also be used. It will be appreciated that the above examples of sealants are being listed for illustration purposes only, and that any number of different types of sealants could be used.

The container 26 of FIG. 1 has a pouch-like configuration (i.e., the container is a flexible container). In one embodiment, container 26 is made of a flexible plastic material and has an air-tight configuration. Container 26 of FIG. 1 also has a packet-like shape (i.e., the container is relatively thin so as to have a thickness less than the length and the width of the container). It will be appreciated that other container configurations can also be used.

Figure 3:
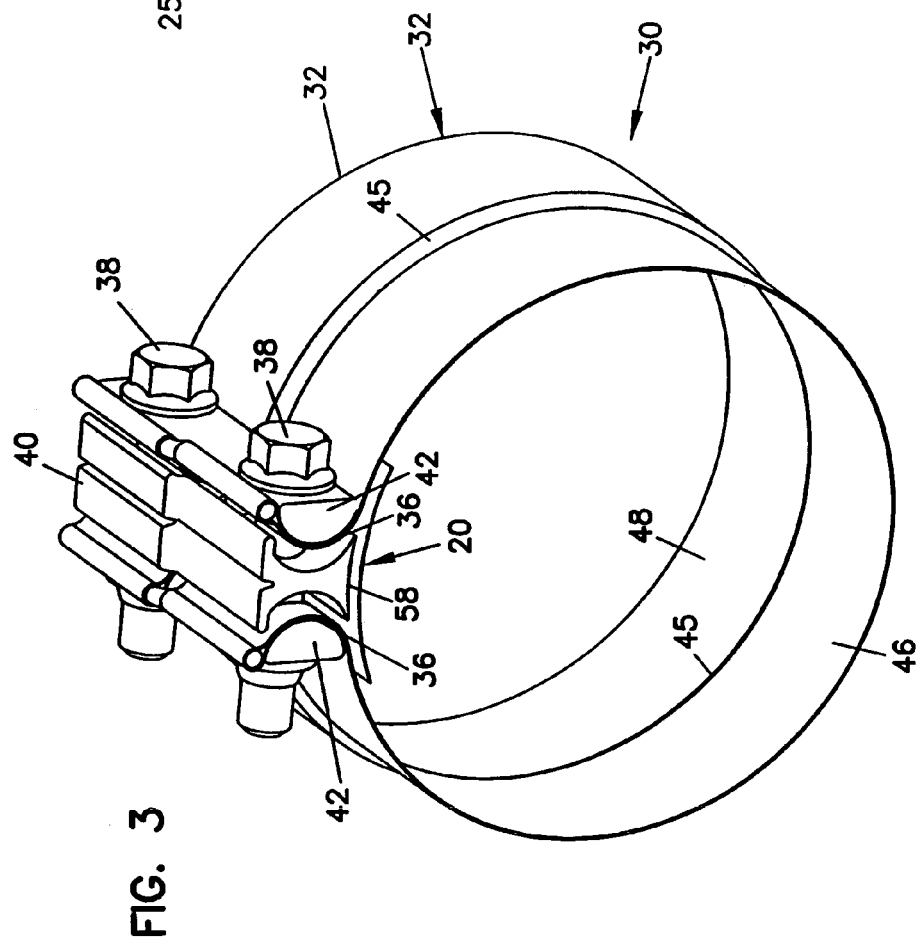
FIG. 3 is a perspective view showing the sealing gasket of FIG. 1 used with an example clamp.

FIG. 3 shows the sealing gasket 20 used in combination with a clamp 30. The clamp 30 includes a band 32 having a main portion 34 that generally defines a cylinder. End portions 36 of the band 32 are fastened together by a pair of fasteners such as bolts 38. A sealing member 40 is mounted between the end portions 36. Outer reinforcing bars 42 are mounted outside the end portions 36 such that the end portions 36 are sandwiched between the outer reinforcing bars 42 and the sealing member 40. The bolts 38 preferably extend through co-axially aligned openings defined through the reinforcing bars 42, the end portions 36 of the band 32, and the sealing member 40. The clamp as shown in FIG. 3 is also described in U.S. Pat. No. 6,634,607 issued Oct. 21, 2003, which is hereby incorporated by reference in its entirety.

As shown in FIGS. 4–6, the bolts 38 extend through the bars 42, the band end portions 36 and the sealing member 40 of the clamp 30, and thread into a nut bar 44. By tightening the bolts 38, the inner diameter of the band 32 is reduced thereby enabling the clamp 30 to be tightened about a lap joint formed between two conduits 80, 82 (see FIG. 9).

Referring to FIG. 3, the main portion 34 of the band 32 is generally cylindrical, and includes a circumferential step 45 that extends about the circumference of the main portion 34. The step 45 provides a diameter transition from a smaller diameter portion 46 to a larger diameter portion 48. The inner surface of the main portion 34 of the band 32 is adapted to engage the outer surfaces of two conduits of a lap joint, and can be referred to as a sealing surface.

Referring to FIG. 4, each of the end portions 36 of the band 32 has a curved configuration so as to define an outwardly facing concave surface 50 and in inwardly facing convex surface 52. The outer reinforcing bars 42 have convex surfaces 54 that nest within the outwardly facing concave surfaces 50 of the end portions 36. The inwardly facing convex surfaces 52 of the end portions 36 fit within concave pockets 56 defined by the sealing member 40.

Figure 8:
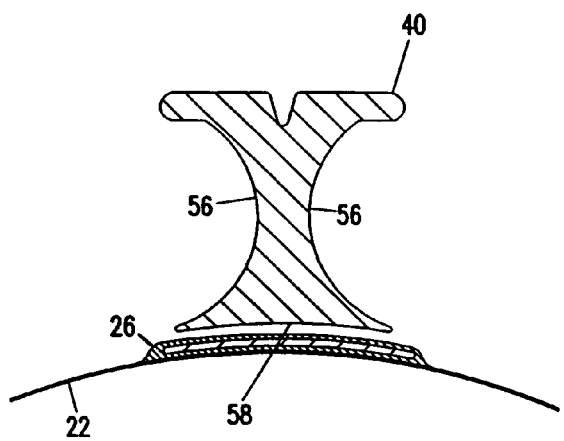
FIG. 8 is a cross-sectional view taken along section line 8—8 of FIG. 6.
Figure 7:
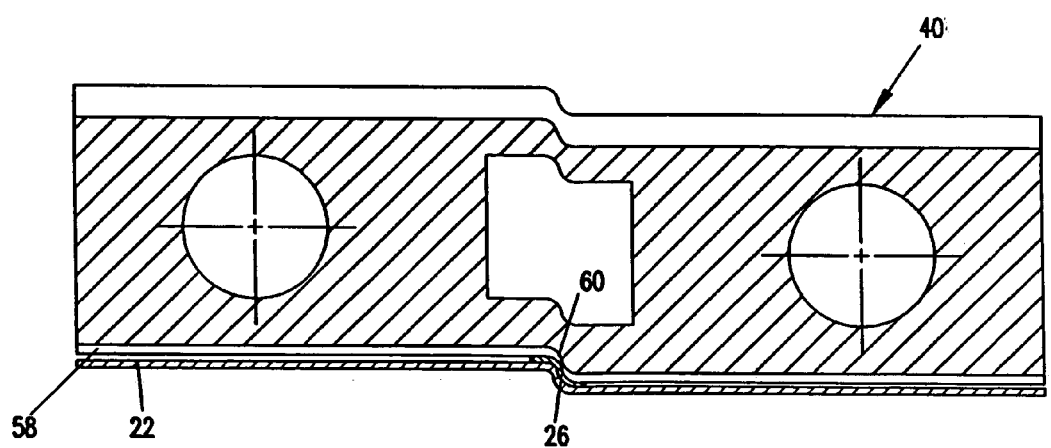
FIG. 7 is a cross-sectional view taken along section line 7—7 of FIG. 4.

Referring to FIGS. 4 and 8, the sealing member 40 has a curved sealing surface 58 adapted to traverse a gap between the end portions 36 of the band 32. The curvature of the sealing surface 58 preferably has a radius that is approximately equal to the radius of curvature of the main portion 34 of the band. As best shown in FIG. 7, the curved sealing surface 58 also preferably includes a step 60 located at a mid-region of the sealing member 40. The step 60 is preferably positioned so as to align with the circumferential step 45 of the main portion 34 of the band 32.

As shown in FIGS. 3 and 8, the sealing gasket 20 is preferably secured to the curved sealing surface 58 of the sealing member 40. In the depicted embodiment, the adhesive tape 22 adheres to the sealing surface 58. As shown in FIG. 4, the sealing gasket 20 preferably has a width W that is sufficiently wide to traverse the gap between the end portions 36 of the band 32. Therefore, portions of the adhesive tape 22 are secured to the sealing surface 58 of the sealing member 40 as well as to the inner surface of the main portion 34 of the band 32.

Referring to FIG. 7, the sealing gasket 20 is shown extending along the entire length of the sealing member 40. It has been determined by the inventors that a primary leak location is adjacent the step 60 in the sealing member 40. Therefore, the sealing gasket 20 is positioned such that the container 26 of sealant material 28 is positioned directly at the step 60.

It will be appreciated that gaskets in accordance with the principles of the present invention can be used with any number of different types of clamps. Accordingly, sealing gaskets in accordance with the principles of the present invention can be adhered to any location where it is desirable to prevent leakage. In other embodiments, it may be desirable to provide a sealing gasket having a container of sealant material that extends about the entire interior circumference of a conduit clamp. For example, in one embodiment, a sealing gasket can be placed so as to extend about the entire circumferential step 45 of the band 32. It will be appreciated that the size and shape of the sealing gasket 20 can be varied depending upon its intended use.

FIG. 9 shows the clamp 30 in the process of being used to seal a lap joint between first and second conduits 80 and 82. The first conduit 80 has a smaller diameter than the second conduit 82, and is configured to slide within the second conduit 82. After the first conduit 80 has been inserted into the second conduit 82, the clamp 30 is tightened about the overlapped region of the conduits 80 and 82. As the clamp 30 is tightened (e.g., by tightening bolts 38), the diameter of the band constricts. As the clamp 30 is further tightened, the band 32 stretches about the lap joint and deforms so as to provide a tight seal about the lap joint. Concurrently, as the clamp 30 is tightened about the lap joint, pressure causes the container 26 to deform and the sealant material 28 to flow to fill void areas between the clamp 30 and the conduits 80, 82. In some embodiments, the container 26 breaks to allow the sealant material to be dispensed to the void areas (e.g., particularly in the region adjacent step 60). In other embodiments, the container does not break, but merely deforms to allow the sealant to flow to or otherwise fill the void areas. Thereafter, the sealant material 28 preferably dries, cures or otherwise hardens or sets so as to provide a fluid tight seal between the clamp 30 and the conduits 80, 82.

With regard to the forgoing description, it is to be understood that changes may be made in detail, especially with respect to the shape, size and arrangement of the parts. It is intended that the specification and depicted aspects be considered illustrative only and not limiting with respect to the broad underlying concepts of the present disclosure.

We claim:

1. A clamp device comprising:
   a band having first and second opposite end portions;
   a sealing bar that mounts between the opposite end portions of the band;
   a fastening arrangement for drawing the first and second end portions of the band toward one another to tighten the clamp device; and a packet secured to the sealing bar, the packet containing a sealant.

2. The device of claim 1, wherein the sealant is a flowable sealant.

3. The device of claim 1, wherein the sealant is a paste.

4. The device of claim 1, wherein the packet is adapted to break when the clamp is tightened about the lap joint such that the sealant flows from the container and fills void areas between the clamp device and a structure being clamped.

5. The device of claim 1, wherein the packet is configured to deform without breaking to allow the sealant to move to void areas between the clamp device and the structure being clamped.

6. The device of claim 1, wherein the sealant includes a liquid containing a filler material.

7. The device of claim 1, wherein the packet is secured to the sealing bar by adhesive.

8. The device of claim 1, wherein the band includes a first sealing surface and the sealing bar includes a second sealing surface, the second sealing surface being positioned to traverse a gap between the end portions of the band.

9. The device of claim 8, wherein the packet is secured to the second sealing surface.

10. The device of claim 9, wherein second sealing surface defines a step.

11. The device of claim 10, wherein the first sealing surface defines a circumferential step that aligns with the step defined by the second sealing surface.

* * * * *